Sept. 24, 1935.　　　　J. M. HAND　　　　2,015,307
ROTARY PUMP, COMPRESSOR OR DRIVEN MOTOR
Filed Jan. 17, 1933　　　8 Sheets-Sheet 1

Inventor
James M. Hand,
By Fisher & Pedersen,
Attorneys.

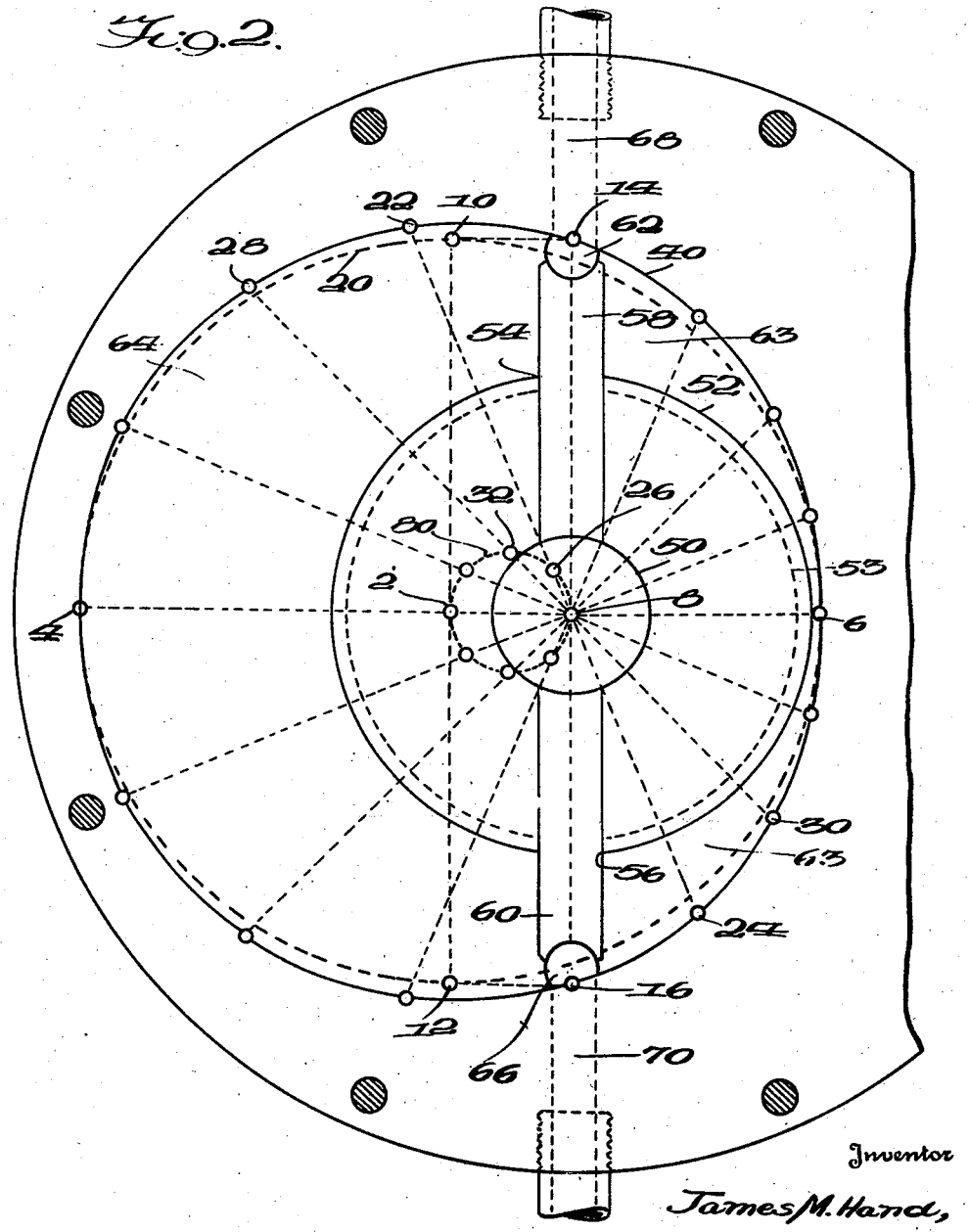

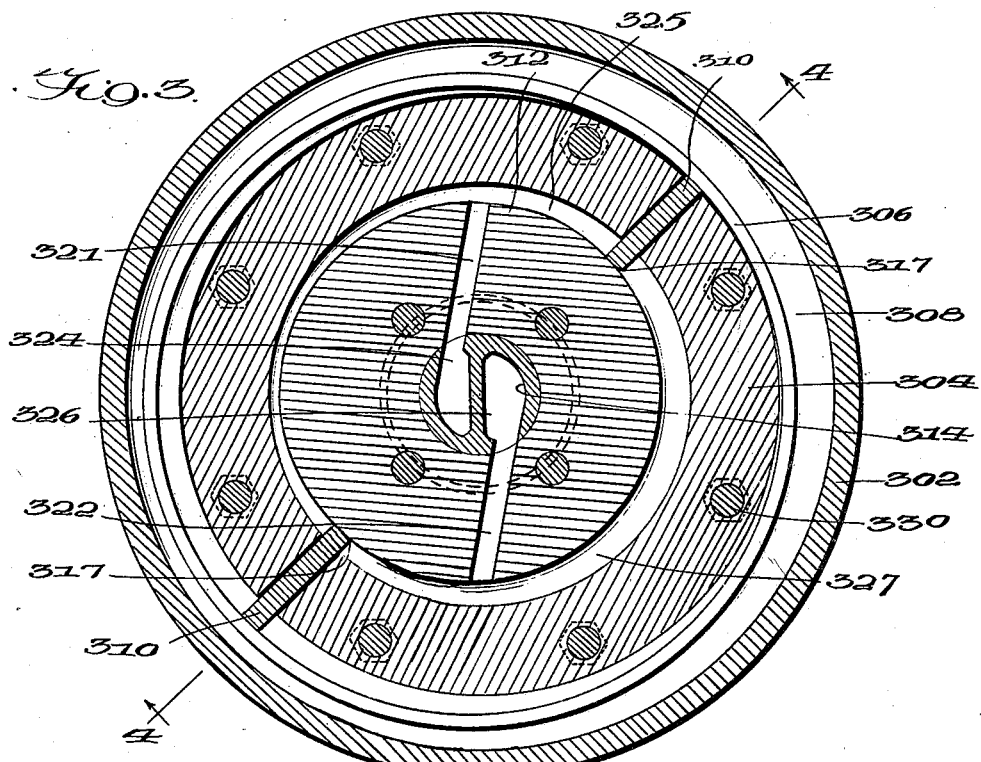
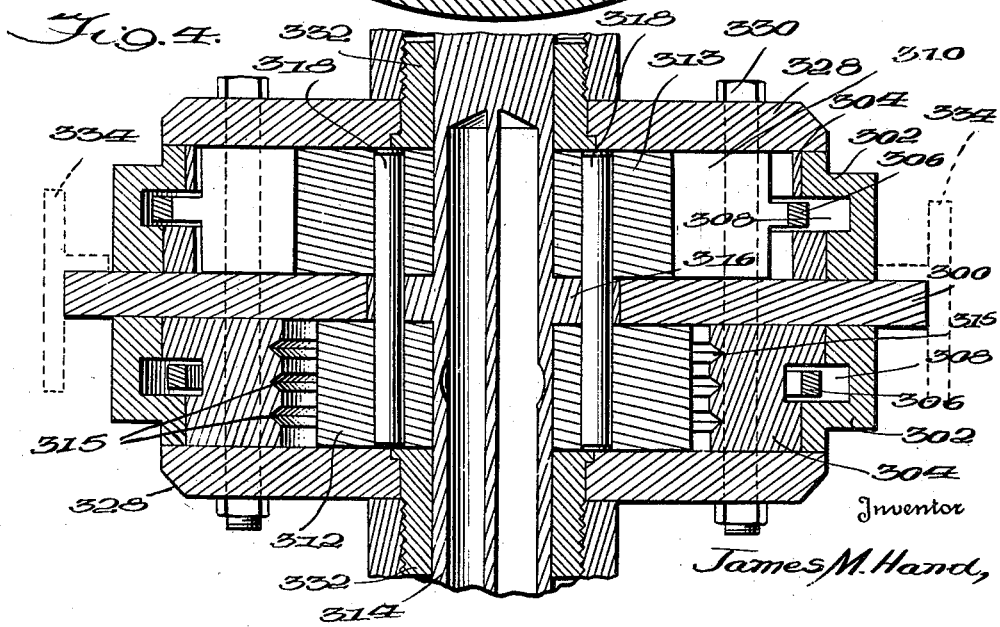

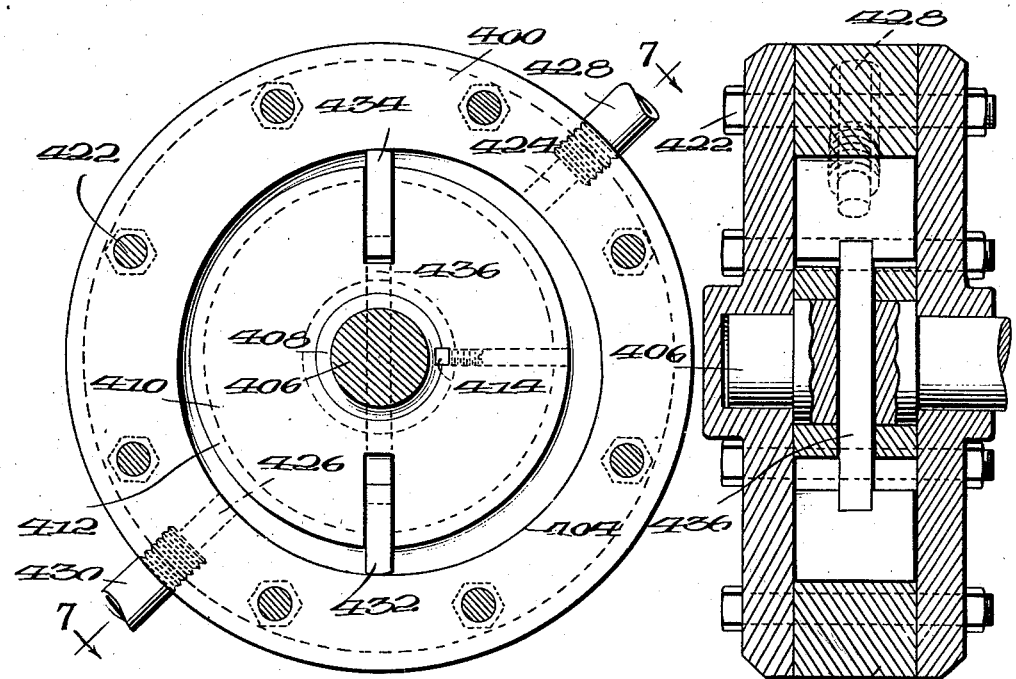
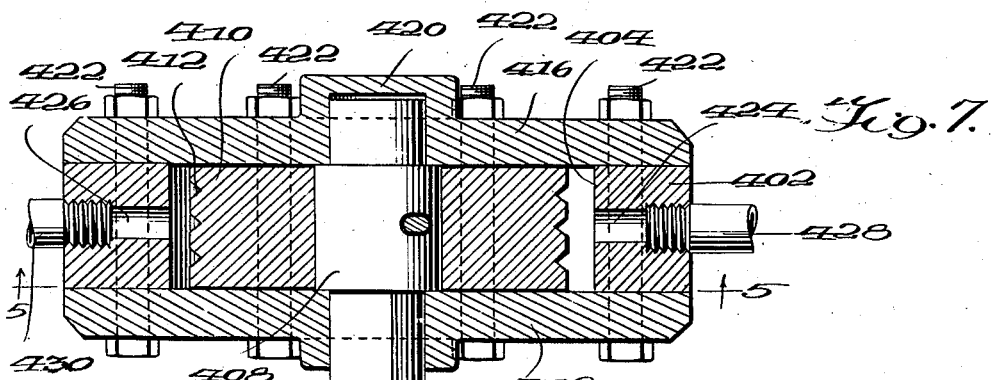
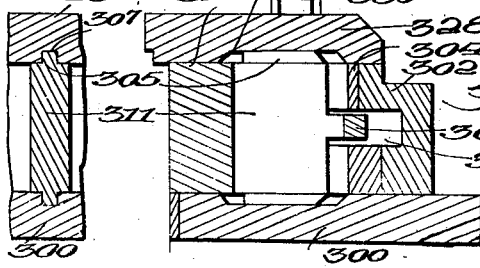

Sept. 24, 1935.  J. M. HAND  2,015,307
ROTARY PUMP, COMPRESSOR OR DRIVEN MOTOR
Filed Jan. 17, 1933  8 Sheets-Sheet 5
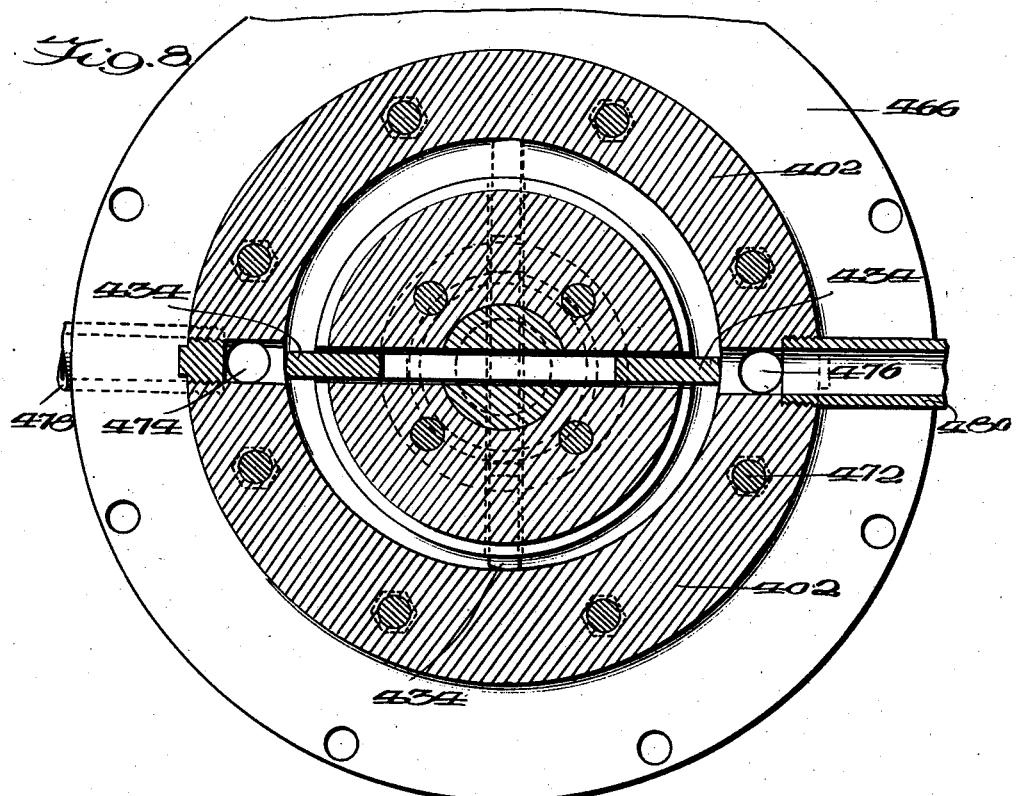
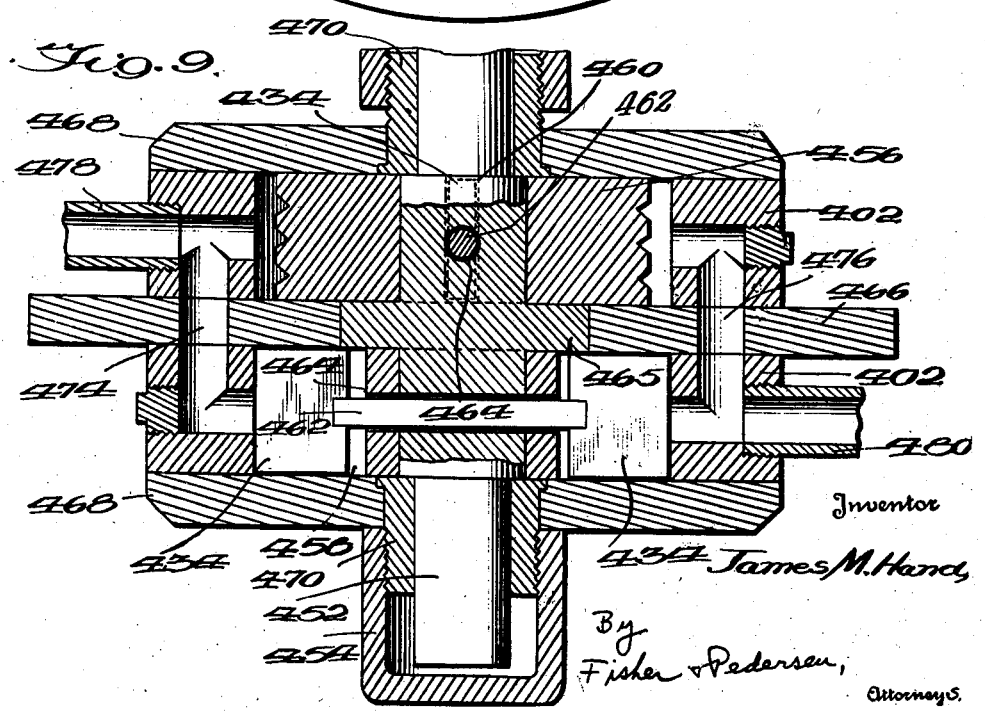

Sept. 24, 1935.  J. M. HAND  2,015,307
ROTARY PUMP, COMPRESSOR OR DRIVEN MOTOR
Filed Jan. 17, 1933.  8 Sheets-Sheet 6
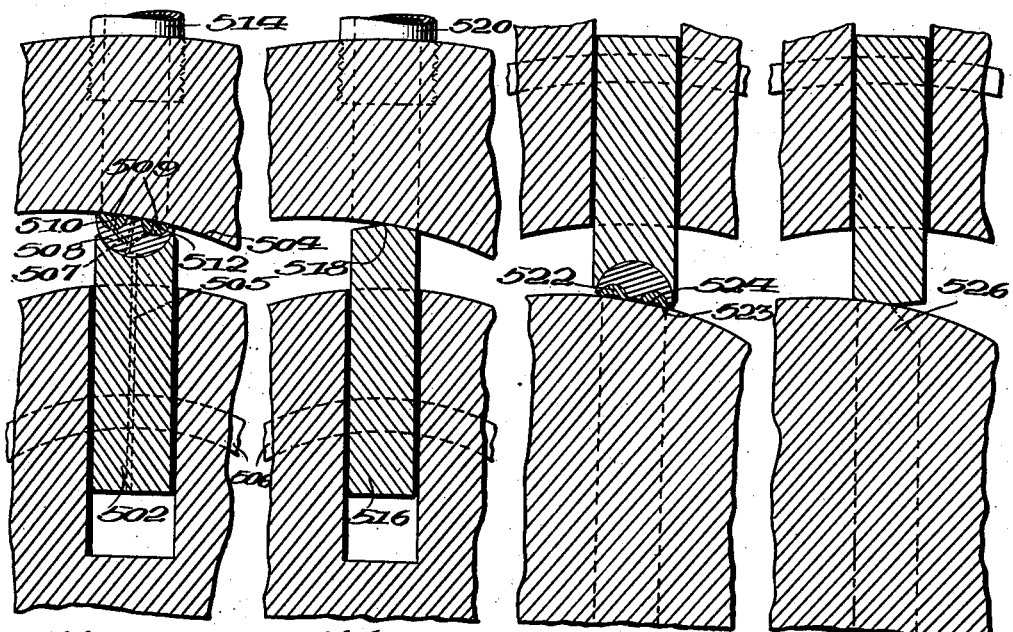
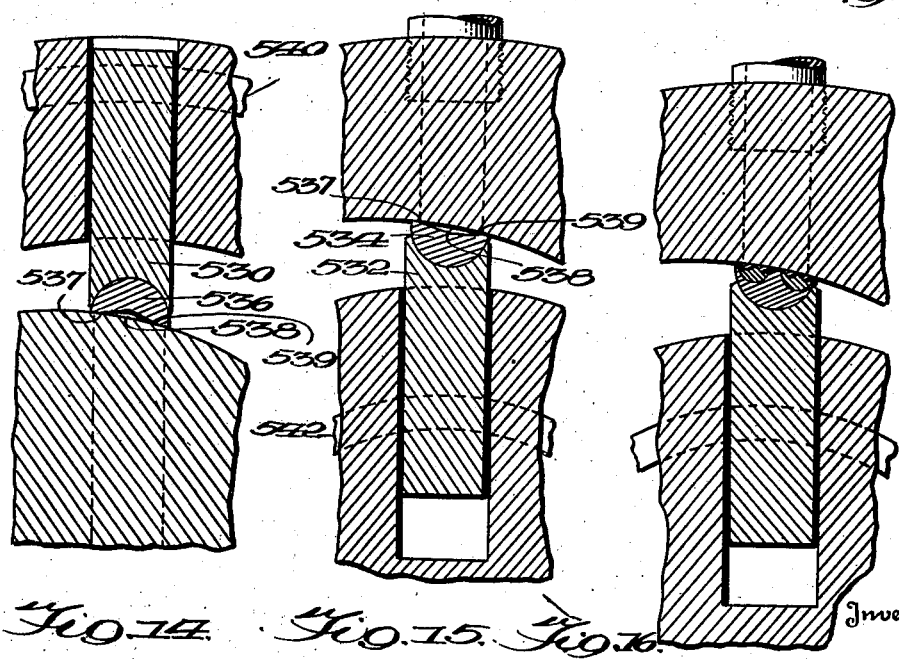
Inventor
James M. Hand,
By Fisher Pedersen,
Attorneys

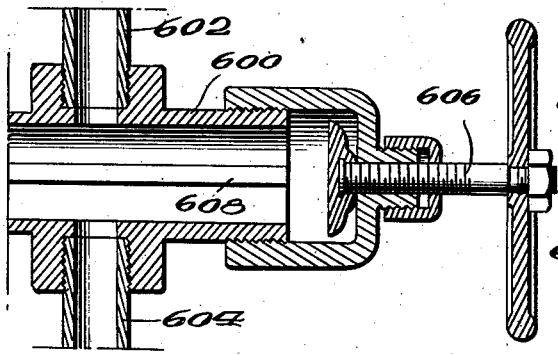
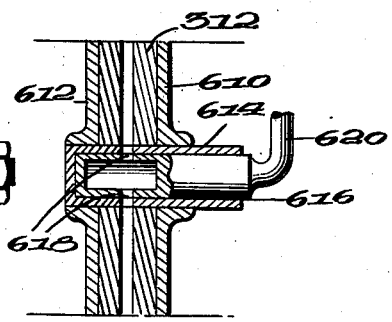
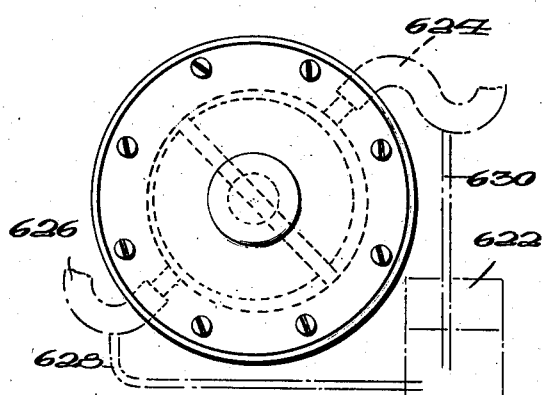
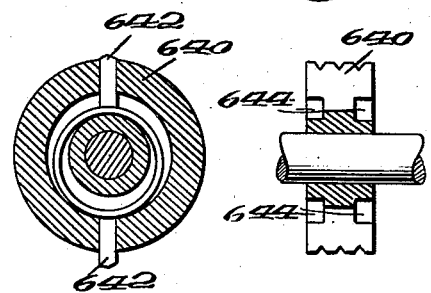
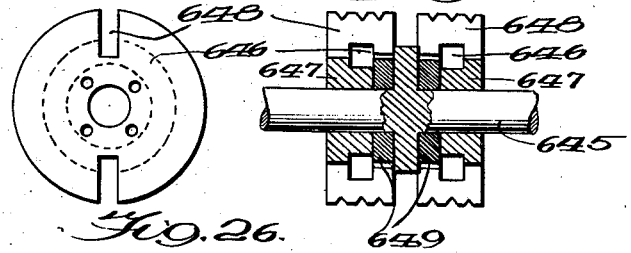
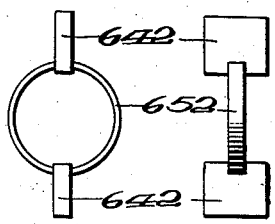

Sept. 24, 1935.  J. M. HAND  2,015,307
ROTARY PUMP, COMPRESSOR OR DRIVEN MOTOR
Filed Jan. 17, 1933   8 Sheets-Sheet 8
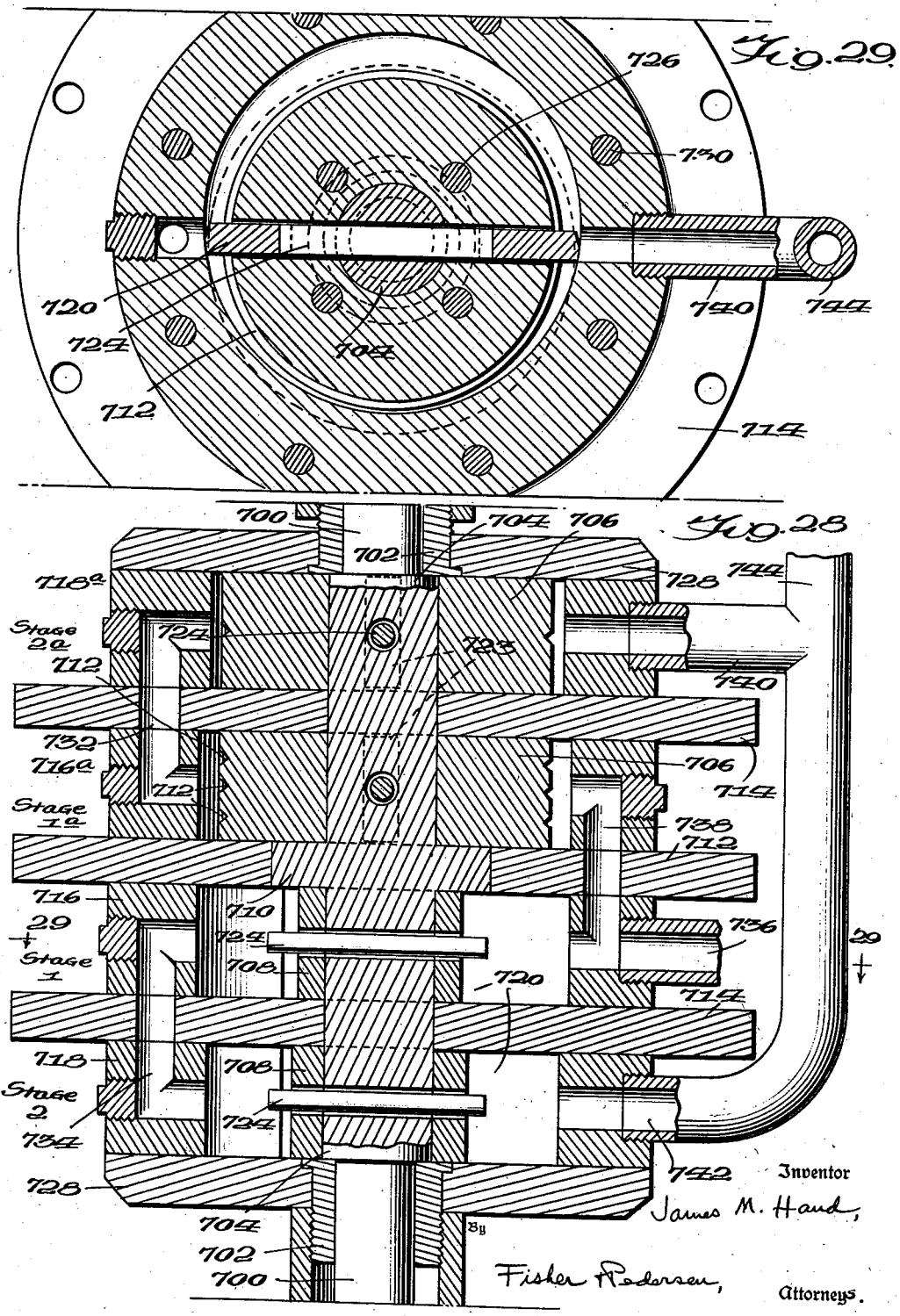
Inventor
James M. Hand,
By Fisher Pedersen,
Attorneys.

Patented Sept. 24, 1935

2,015,307

UNITED STATES PATENT OFFICE 2,015,307

ROTARY PUMP, COMPRESSOR, OR DRIVEN MOTOR

James M. Hand, Shubuta, Miss.

Application January 17, 1933, Serial No. 652,222

20 Claims. (Cl. 103—137)

This invention relates to a mechanical device for use as a rotary pump, compressor or driven engine. More particularly the invention relates to a form of construction of such mechanical device which may be employed for pumping fluids, for compressing elastic fluids, for transforming potential or kinetic energy of fluids into mechanical energy and for other purposes as well.

In analogous devices of the prior art it has been customary to employ devices of this general character which were suitable for only one particular purpose such as a rotary pump but these devices were not so designed as to have any general utility for other purposes. Some might be suitable as a rotary pump but would be useless without substantial modification if the compression of elastic fluids were attempted or if steam or other fluid under compression were used in an effort to transform the energy into mechanical energy.

In the device forming the subject matter of the present invention a structure has been secured which can be employed for many purposes with a high degree of efficiency in each of these. The particular arrangement of the rotor and stator with respect to each other, to the gates and to the ports is such as to give a high degree of efficiency whether the device is employed as a rotary pump, compressor, driven engine or other analogous machine. It is therefore, among the objects of this invention to provide a device of the character described which may be used in many varied relationships without any substantial change and which will give smooth uniform operation in all these relationships.

The invention is designed particularly to attain a high degree of smoothness in operation as a pump or compressor and involves a form of construction rendering it easily assembled and relatively simple in operation. The form of construction furthermore is such as to attain a high degree of durability or life and is of a form that may be manufactured at a lower cost than that of similar devices heretofore manufactured.

It is an object to construct a device of this character so that it may be reversibly operated in clockwise or counter-clockwise directions and in whichever direction operated, the flow or application of power will be effective, uniform, continuous and uninterrupted without any check, break, or pulsations to interfere with the smooth action and steady results or cause undue strain or vibration whether used with a non-elastic circulating medium such as oil or water, or used with elastic circulating mediums such as air, gas or steam.

A further object is to provide a device in which all moving parts have a rotary motion by means of which a uniformly changing amount of work is done with no unbalanced strains, and with freedom from vibration and a minimum of friction.

It is also an object to construct a device so that valves and undesirable springs are eliminated while at the same time the gates employed are constantly held seated under uniform pressure without the use of centrifugal force.

It is an important object to construct a device which may be in two forms or types one of which is a reverse application of the fundamental principles of the other. In one type the shaft, piston and vanes rotate, while the eccentric cylinder and its ports may remain stationary; and in the other type the cylinder and abutments rotate, while the shaft and piston with the ports may remain stationary.

A further important object is to provide a device in which only two compartments are possible per unit even though oppositely disposed ports are employed.

A further object is to provide a device which when used as a gas, air, or refrigerant compressor, the position in which the stator is fixed will determine the amount of cooling and lubricating oil retained within the compartment, thus determining the degree of compression obtainable from the device.

A still further object is to provide a device in which the gates are so constructed as to eliminate all undesirable internal compressions, hammering or other bad effects ordinarily encountered and which gates at all times form an efficient seal between the compartments and at the neutral point effectively prevent back flow.

Further objects include the provision of a device which may be employed as a clutch or brake either through the use of control valves or mechanical means for controlling the gates; as well as a driving mechanism for vehicles by attachment to the wheels.

A still further object is the provision of a particularly shaped stator with which may be employed constant length gates, vanes or abutments held in operative position by members having a certain amount of flexibility to compensate automatically for wear or for imperfections of manufacture.

A further and important object is the provision of a device of the general character described which may be combined with other similar devices in a single balanced unit, mounted on the same shaft, if desired, and by the arrangement of gates, angles of eccentricity, ports, etc., either multi-stage compression or expansion secured or parallel flow of fluids attained.

Other objects will be apparent from the sequent description of the invention.

The rotary pump or compressor forming the subject matter of this invention is a machine of the eccentric rotary type having an outer cylinder surrounding an inner piston with the piston attached rigidly to a shaft.

By rotating either the piston or the cylinder with respect to the other the eccentric feature of the machine causes a movement of the circulating medium and this movement is checked or controlled by the addition of sliding gates. When these gates are associated with the rotating piston and slide against the cylinder they may be termed vanes while when their position is reversed and they are associated with the rotating cylinder and slide on the piston they are called abutments. Either the piston or the cylinder may be the eccentric member and the gates are arranged to slide in the non-eccentric member so that when either member is rotated with respect to the other an alternate suction and compression is caused in each of the two compartments which the gates separate. Reversing the direction of rotation will cause a respective reversal of the suction and compression in the aforesaid compartments. This reversal of rotation will, when the machine is used as a pump or a compressor, cause a reversal of inlet and outlet and cause the circulating medium to flow in the opposite direction.

The inlet and outlet ports are openings in the surface of the eccentric member on which the gates seat and are located on or near a straight line drawn through the centre of the shaft at right angles to it and also at right angles to the transverse axis connecting the most eccentric and least eccentric points on the surface of the eccentric member.

The sliding gates are located on an axis intersecting the centre of the shaft and at ninety degrees to it and so constructed that they may slide in the non-eccentric member while contacting with and seating on the eccentric member.

The distance from the centre of one gate seat to the centre of the opposite gate seat on the same axis one hundred and eighty degrees from it is fixed as a definite length as will be shown later and hence the gates may be connected either rigidly or semi-rigidly with respect to their opposite seats and still remain seated on the surface of the eccentric member for all positions of rotation of either piston or cylinder. This feature is made possible by the peculiar shape of the surface of the eccentric member on which the gate seats revolve.

The longitudinal section of this peculiar surface parallel to the shaft is made to conform to the corresponding section of the gate seat and for illustration and practical purposes may be a straight line parallel to the shaft. Its peculiarity is found in the transverse section of this eccentric surface which appears as a bean or heart-shaped curve, being eccentric with respect to the centre of the shaft and yet having its eccentric surface so constructed that all straight lines drawn through and at right angles to the centre of the shaft, which point is herein termed the centre of eccentricity, will be the same length between their respective two intersections with the peculiar eccentric surface. A particular form of this shaped curve is called a limaçon.

Thus it may be seen that the distance between the two opposite gate seats in the same cylinder may be definitely fixed and still the gates remain seated for all positions of rotation of one member upon the other.

The gates are always arranged to slide in the non-eccentric member and seat on the peculiar surface of the bean-shaped curve referred to above. Two oppositely disposed gates constitute a pair for each cylinder with its corresponding piston. No more gates are needed or usable where the circulating medium is composed entirely of a non-compressible substance as a liquid. Though not usually necessary, more gates could be added where a compressible gas or a mixture of a gas and a liquid is used as a circulating medium. The use of more than two gates per cylinder may call for a corresponding readjustment of intake and outlet ports, however I prefer to use only two oppositely disposed gates per cylinder with its corresponding piston.

Viewed in transverse section at right angles to the shaft, the inner surface of the cylinder and the outer surface of the piston at no time make contact, but instead, a free opening is allowed between the two for the circulating medium to pass freely to all parts of the respective compartments formed by the two gates which form the seal between the two compartments. Though not necessary, it is considered preferable to make the clearance between the cylinder and piston slight and obtain the opening for free flow of the circulating medium by recesses such as notches or grooves in the surface of the non-eccentric member forming the surface of the compartments.

The inlet and outlet ports, as stated above, are in the surface of the eccentric member and so located that when either member is rotated with reference to the other the two gates pass these two openings or ports at the same time that one compartment formed by the two gates is changing from compression to suction and the other compartment vice versa from suction to compression.

For certain purposes both members may be rotors but generally either the piston or the cylinder may be the rotating member and as such it is evident that one of the two ports referred to above will always be the discharge port for both compartments and the other port will be the inlet port for both compartments within the same cylinder for a clockwise revolution of the rotating member. A counter-clockwise revolution will reverse the above, the former inlet becoming the discharge port and the circulating medium will flow in the opposite direction. Thus the machine is operative in either direction of rotation. Usually, when used as a pump or compressor, only one direction of flow is desired and as a matter of choice only one may in such cases be used.

Where the compression obtainable in this device is used as a brake or a clutch, the reversing of operation by reversing the relative rotation can and may be used.

All the above features may also be used in this device as a driven engine or motor operated by either steam, gas or air under pressure, or a liquid such as oil under pressure may be used as the circulating medium to operate the device as an oil driven motor. It is therefore apparent that with one member fixed and the other member free to rotate if oil were forced into one of the ports the device would become an oil motor; with compressed air an air motor; with steam, a steam engine, etc., which can be reversed by changing the port of discharge to the port of inlet.

Usually it will be more advantageous and more efficient to construct two or more cylinders with their necessary pistons, gates etc., into one machine, so placing the eccentric members, or the gates that the compression in the various compartments will occur at various times with respect to the various cylinders, thus a more uniform flow of the circulating medium, delivery of power or consumption of the energy is obtained.

In a two cylinder machine with two eccentric cylinders having their corresponding eccentric points placed in juxtaposition the four gates which slide in the two pistons may be held each in a different quadrant with respect to the shaft and pistons. This makes the intake and discharge actions in one cylinder follow by a quarter of a revolution the corresponding action in the other cylinder, and thus with four cycles per revolution the circulation and power used or developed is practically balanced.

The gates remaining as above, the two cylinders might be placed with their corresponding eccentric points in contraposition with the same effect as above except the inlet from one cylinder would be on the opposite side of the machine from the inlet of the other cylinder. This of course would counterbalance the eccentric portions of the machine and be advantageous if desired to use the eccentric members as rotors. Also if desired the gates of the two adjoining cylinders could be placed in the same plane and the corresponding eccentric portions of the two cylinders placed in different quadrants. A further modification involves placing the gates of the two adjoining cylinders in the same plane and the corresponding eccentric portions of the two cylinders in contraposition; which arrangement would be advantageous in a multiple stage assembly. Any number of cylinders with their corresponding pistons, gates, etc., may be constructed into a single machine in varying positions of either eccentric members or gates.

A two cylinder machine with two eccentric pistons having their most eccentric points placed in contraposition and with the gates in the two respective cylinders fixed so as to slide in different quadrants is also contemplated in this invention. The outlets and inlets for the circulating medium are through ports in the pistons as described above which are connected by ducts through the pistons to passages in a hollow shaft. The positions of eccentric members and gates may be varied in different cylinders, as may also the pistons, gates, etc., which may be constructed into one machine and thus obtain similar practical results to those described above.

If desired the present device may be embodied in a multiple stage rotary pump, compressor, or driven engine. To secure this result without cumbersome connections outside of the machine it is generally desirable to arrange two or more adjacent devices in which the adjacent eccentric members are in contra-position or at 180° from each other. By this arrangement the inlet for one unit will be on the opposite side from the inlet for the other and a simple connection within the cylinder or within the piston may be made to join the outlet of one with the inlet of the other. Two or more multiple stage units may be combined in a single machine in which case, it may be desirable to set the gates of one unit at right angles to those of the other unit.

Adequate provision for proportioning the size of the compartments in series can be made by controlling either the relative size of the eccentric and non eccentric members and/or the relative amount of eccentricity. It will, of course, be realized that various additional modifications may be made by those skilled in the art without departing from the spirit and scope of the present invention.

Where this device is used with a circulating medium consisting of a fluid with lubricating qualities such as oil, obviously no other means of lubrication will be required. Grease, packing, and other means commonly in use may be resorted to to form an efficient seal and minimize friction and wear where the circulating medium is a non-lubricating fluid.

Where the circulating medium is steam, air or other gas, lubrication and an efficient seal against leakage of the gases may be effected by an additional inlet for lubricating oil which may be injected under pressure at or near the inlet for the gas.

A means may be provided for allowing the lubricating oil to separate from the air or gas at or near the outlet from the compressor and return to its storage and cooling reservoir where it is under pressure from the compressor which will keep the oil circulating as the device is operated and thus seal, lubricate, and cool the interior compartments of the device while it is being used as an air or gas compressor. Where, due to prolonged periods of operation, the heat generated by the compression of the air or gas becomes sufficient to be objectionable a cooling coil of usual type used for such purposes may be added. One method of effecting this cooling would be to conduct the mixture of gas and lubricant as it is ejected from the compressor through ducts to a cooling coil located external to the machine and thence back into the reservoir where the oil and gas are allowed to completely separate. Another method would be to cool only the lubricant by allowing this lubricant to be forced from the reservoir through a duct to the usual cooling coil external to the body of the machine where it is cooled and thence conducted directly back to the device and into the port of inlet for the lubricant. Following this procedure only cooled lubricant would be admitted to the interior compartments and moving parts of the compressor.

In general the principle of the device is the same for all machines, although its application is divided into two general types which may be referred to as type EXT and type INT. The two types are a somewhat reversed application of the same principle so that each part or feature has its reversed counterpart in the other of the two types.

Type EXT may be used to designate machines where the eccentric curve is applied to the cylinder. In all EXT type machines the pair of gates of each machine are connected either rigidly or semi-rigidly to each other directly through or around the centre of the shaft and are free to slide with respect to the piston and shaft. Connection through the shaft is accomplished by a connecting rod between the gates slidable in a hole through the shaft. Instead of using this means to hold the gates seated against the eccentric cylinder a recess may be provided in the piston to contain one or more rings which surround the shaft and bear against the gate ends. If the gates are connected with a pin through the shaft, sufficient clearance should be left around the pin to allow lubricant to pass freely and prevent compression of the lubricant at the gate heads, which compression would cause an undesirable binding effect on the device when rotated. The inlet and outlet ports for all EXT type machines are openings through the cylinders as described above.

Type INT may be used to designate machines where the eccentric curve is applied to the pistons.

In INT type machines the pair of gates of each machine are connected either rigidly or semi-rigidly to each other by a ring in the cylinder. I prefer to make this ring circular but of slightly less inside diameter than the fixed distance between the head of the gates which it is to surround so that this ring will have to be compressed slightly to insert the gates in place. I prefer to make the ring of a metal which when distorted by pressure as above will tend to resume its circular shape and exert a slight pressure on the head of the gates which it surrounds thus causing the gates to seat upon and make an effective seal with the piston as the device is operated by rotation of either member with respect to the other member.

Preferably this ring is located in a recess machined into the cylinder so that the ring bears directly on the head of the gates. I have chosen to make this recess by constructing the cylinder in two parts so that in assembling it one part will pass directly over the outside diameter of the ring and the other part will pass partly through the inside diameter of the ring thus allowing the ring to be entirely enclosed within the assembled cylinder. The recess should have sufficient clearance to allow the ring to move or float freely within the cylinder as the gates are forced to slide back and forth by revolving the cylinder and its attached parts with respect to the eccentric piston. The recess should also have sufficient clearance to allow a free flow of lubricant between gate heads. Either member or both may rotate, however as a rule it is preferable to use the eccentric piston and shaft as the stator and the cylinder and gates as the rotor in the INT type machines, as this locates the inlet and outlet ports for the circulating medium on the stationary portion of the machine, which is an obvious advantage on either pump or compressor of usual type. For the same reason it is preferable with the EXT type machines to use the eccentric cylinder as the stator and the shaft, piston and gates as the rotor.

The inlet and outlet ports for all INT type machines are through the eccentric pistons. These ports are located on the peculiar eccentric surface of the piston on which the gates seat and at points in a plane passing through the longitudinal axis of the shaft at right angles to a straight line joining the points of greatest and least amount of eccentricity of the piston.

These inlet and outlet ports are connected by passages through the piston to a hollow shaft having two compartments to serve intake and outlet respectively.

This hollow shaft may have an inlet at one end and an outlet at the other end, however I prefer generally to have inlet and outlet at the same end. To construct such a shaft, I take a hollow shaft similar to a piece of pipe with one end entirely plugged; and into the hollow portion drive and weld a partition.

A valve placed on the end of a hollow shaft may be opened to bypass the circulating medium through or around the partition in the hollow shaft, so as to allow the circulating medium to flow back and forth between the compartments as compression and suction alternately occur in each compartment formed by the gates separating the space between the cylinder and piston. This valve may be used to take advantage of the braking or clutching power of the device as it attempts to compress a practically non-compressible fluid. The valve may be used to make the device, when used as a pump or compressor, operative or inoperative depending on whether the valve is in closed or open position.

If brake or clutch effect only is required of the device, it is not necessary to partition the hollow shaft, but to insert instead of the partition, an inner shaft with holes through it; which inner shaft may be rotated within the hollow shaft at will by external means so that it may be caused to obstruct or bypass, as desired, the non-compressible circulating medium directly back and forth between the two compartments formed within the cylinder by the gates. Also a similar brake and clutch effect may be obtained in either the INT or EXT type by omitting the ports entirely and substituting therefor a mechanical means of controlling the gates so as to hold them seated or unseated at will.

Referring now to the more specific embodiments which are illustrative of this invention, attention is directed to the drawings forming a part of this application in which;

Fig. 2 is a sectional view somewhat diagrammatic of the piston and cylinder showing their respective relationships in the EXT type;

Fig. 3 is a section showing the INT type with attendant parts;

Fig. 4 is a longitudinal section through the centre of the shaft of a combination of two INT types combined into one machine along the line 4—4 of Fig. 3;

Fig. 5 is a side view of the cylinder and piston of the EXT type;

Fig. 6 is a cross section of the cylinder and piston of Fig. 5 taken through the centre of the shaft and the vanes;

Fig. 7 is a section similar to Fig. 6 taken through the centre of the shaft and the centre of the inlet and outlet ports along the line 7—7 of Fig. 5;

Fig. 8 is a cross section through one of the two cylinders making up a dual device showing the vanes of an EXT type set in different quadrants;

Fig. 9 is a longitudinal cross section of the same taken through the centre of the shaft and the inlet and outlet ports;

Figs. 10 to 16 are cross sectional views illustrating the structure of various vanes or abutments which may be employed as gates in this invention;

Fig. 17 illustrates in cross section a type of valve which may be employed with a partitioned shaft as a general control or when the device is used for a brake or clutch;

Fig. 18 illustrates in cross section a valve for controlling communication between the two compartments when the device is employed for braking or clutching;

Fig. 19 shows diagrammatically a device for lubricating a rotary pump, compressor or driver engine;

Fig. 20 is a cross sectional view through the rotor or piston showing the ring structure for positioning the vanes;

Fig. 21 is a cross sectional view of a rotor showing recesses for two rings to urge against the vanes;

Fig. 22 is a side view of the rotor showing the ring recess in dotted lines;

Fig. 23 is a view in cross section of a combination of two rotors or pistons showing a central recess in each for one ring;

Fig. 24 is a side view showing the relationship between the ring and the vanes in the double ring type;

Fig. 25 is a front view of the vanes provided with two rings to hold them in position;

Fig. 26 is a side view of a pair of vanes and a ring for the single ring type;

Fig. 27 is a front view of the vanes and a ring for the single ring type;

Fig. 28 is a cross section taken through the centre of the shaft and ports of a composite device composed of four EXT type devices assembled as two units of a two stage pump or compressor or a double expansion driven engine;

Fig. 29 is a section taken along the lines 29—29 of Fig. 28 looking in the direction of the arrows;

Fig. 30 is a sectional view of a modified abutment structure showing its relationship with side walls or adjacent dividing plates; and Fig. 31 is a detailed view of a portion of Fig. 4 showing this modified abutment structure.

Figure 1:
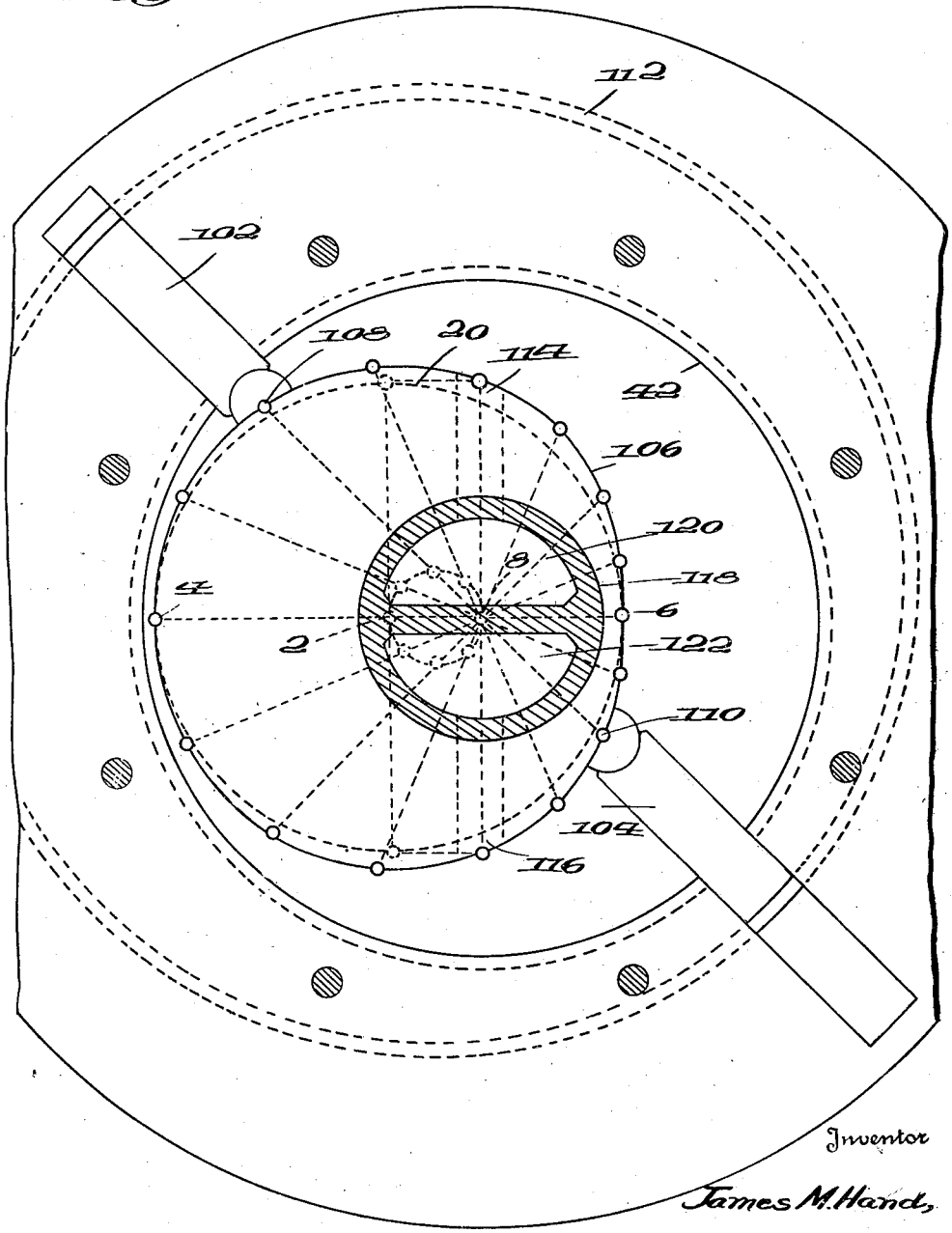
Fig. 1 is a sectional view somewhat diagrammatic of the piston and cylinder showing their respective relationships in the INT type.

On Figs. 1 and 2 are diagrammatically shown one arrangement by which the curvature of the eccentric member is determined. While hereafter the description will be particularly directed to Fig. 2, the same treatment is applied in Fig. 1, differing only in that in the latter case the eccentric curve is applied to the inner member forming what is herein termed the INT type, while in the former (Fig. 2) the eccentric curve is applied to the outer member forming the EXT type.

The circle 20 shown in dotted lines of a size approximately that of the final cylinder has a centre at 2. On a diameter 4—6 of this circle a point 8 is selected which determines the eccentricity of the device. A circle 80 is then described having its centre at a mid-point between 2 and 8 on the line 4—6. At right angles to the diameter 4—6 through the centre 2 a diameter 10—12 is drawn. Parallel to that through the point 8 a line 14—16 is also drawn of equal length to the diameter of the circle 20. The centre of the line 14—16 is at the point 8. The line 14—16 equal to the diameter of the circle 20 is then caused to rotate about the circle 80 and its mid-point is always kept on the perimeter of this circle and a portion of the line also passes through the point 8. Various positions of this line are shown for instance, the line 22—24 passes through the point 8 and has its centre on the circle 80 at the point 26. Another line 28—30 passes through point 8 and has its centre at the point 32 on the circle 80. By continuing the rotation of this line about the point 8 with its mid-point on the circle 80, a number of additional points on the perimeter of the heart or bean-shaped curve 40 are located. It will be noted that when the line 14—16 has been rotated until its position is at right angles to that originally assumed that it becomes a diameter of a circle and coincides with diameter 4—6 of the circle 20. It will thus be seen that any line drawn from any point on the perimeter of the limaçon, a bean or heart-shaped curve 40, through the point 8 to the opposite side of the perimeter will be of equal length to any other line drawn under the same conditions. Therefore, when a curve of this shape is used either for the cylinder 10 as in Fig. 2 or the piston as in Fig. 1, the length of the vanes which rotate about a point 8 as their centre will always be constant.

A variation of the above method, which may be equally well used, would be to substitute for the circle 80, a slightly distorted circular, elliptical or truly elliptical curve. This curve would have as its minor axis the line 2—8 and for its major axis a line at right angles to and intersecting the line 2—8 at its mid-point. This ellipse or distorted curve would be symmetrical about its minor axis 2—8, but not necessarily about its major axis. Aside from this possible substitution for the curve 80, the operation of determining the eccentric curve is as outlined above.

This secondary method would determine a similar but slightly different eccentric curve from the one originally outlined and may be used to advantage where a proportionally large amount of eccentricity is desired, as by this method a reverse hump in the eccentric curve near the point 6 may be minimized or eliminated, and also the rate of change in the compartments may be varied and be made practically or absolutely uniform.

The point 8 is herein termed the centre of eccentricity and is also the centre of the shaft 50 or the shaft 118 (Fig. 1). It is the point about which either the noneccentric circular member 52 in Fig. 2 or 42 in Fig. 1 rotate. In Fig. 2 the rotating member 52 is shown as having openings 54 and 56 into which are snugly fitted vane members 58 and 60. These vane members have suitable ends or bearing surfaces 62 and 66 which contact with the surface of the eccentric cylinder 40. As shown in the drawings, the total length of the vanes 58 and 60 with their bearing members 62 and 66 is equal to the length of the line 14—16.

As was shown in the construction of the curve the line 14—16, which rotated about the point 8, determines the shape of the curve 40 and, therefore, as the vane members 58 and 60 rotate about the point 8 and slide with respect to circular member 52 they will follow the shape of the curve 40 neither increasing nor decreasing in length during the rotation. By means of such a structure a more or less rigid connection between the vane members may be employed and resort to cams, springs, etc., is unnecessary.

In the same manner that the vanes 58 and 60 in Fig. 2 retain a constant distance between their bearing surfaces those indicated at 102 and 104 on Fig. 1 are also maintained a constant distance apart since they contact with the surface of eccentric member 106 at points which are always directly opposite the so-called centre of eccentricity 8. It is true that the vanes in both cases (Fig. 1 and Fig. 2) will oscillate back and forth but the distance between the points 108 and 110 will always remain constant. Since this is the case, a more or less rigid connection between the gates may be employed. As illustrated in Fig. 1, that may be a circular member or ring 112.

Referring again to Fig. 2, attention is directed to the position of the ports 68 and 70 on the eccentric surface 40. These ports are located directly opposite to each other on a line which passes through the centre of eccentricity or point 8 or in other words, on a line drawn through the centre of eccentricity at right angles to the line 4—6 which joins the points of greatest and least eccentricity. By this arrangement when the vanes are in the position illustrated in Fig. 2 and have bearing surfaces equal in width to the opening of the ports, both ports will be closed, covered or passed at exactly the same time.

The arrangement of ports in Fig. 1 is corresponding. They are, it will be noted, located on the eccentric member 106 at points 114 and 116 and connect with a hollow shaft 118 divided into two sections 120 and 122. The openings 114 and 116 are on a line drawn through the centre of eccentricity 8 at right angles to the line 4—6, joining the points of greatest and least eccentricity, and in this case also both ports will be closed, covered or passed by the vanes 102 and 104 at the same time.

In comparing Figs. 1 and 2, it will be noted that the ports are located in the eccentric member which is preferably maintained stationary while the circular member is permitted or caused to rotate.

As stated above the two ports 68 and 70 in the stator are so located radially opposite that the two gate seats 62 and 66 pass them at the same identical time that the two compartments are changing, one from intake to output, and the other vice versa, which time of change is referred to as a neutral point or dead centre. By this arrangement of gates, compartments and ports, there is maintained during revolution a uniform and constant change in the compartments which will produce a cycle in each compartment as follows: Assuming a clockwise rotation of the shaft 50 and circular piston 52 as the gates pass the ports, one compartment 63 is undergoing a change from a decrease in size to an increase in size and the other compartment 64 vice versa. For example follow one compartment 63 through a complete revolution. At the beginning or neutral point as the gates pass the ports the rate of change in size is zero. The compartment 63 increases in size at a uniform rate while fluid is permitted to flow or forced through the inlet port 70 until it reaches its maximum rate of change at one quarter of a revolution when the vanes 58 and 60 are horizontal and along the line 4—6, then the rate of change decreases at the same rate as it increased for the next quarter of a revolution when the compartment reaches its maximum size and a zero rate of change in size as 180° of revolution is passed and the gates are passing the opposite port, thus completing the intake half of the cycle for the compartment. For the next half revolution the size of the compartment decreases in the same ratio that it increased while the fluid in the compartment 63 is discharged through the outlet port 68 thus making the discharge half of the cycle and completing a cycle of uniformly changing work as the full circle of revolution is completed and the gates return to their original neutral location at the ports. The opposing compartment 64 has the same cycle as the one followed only being located 180° therefrom will be undergoing exactly the same change 180° behind. Thus for each revolution, two cycles, a half revolution apart, are obtained and by the addition of a second cylinder, four cycles per revolution are obtained located a quarter of a revolution apart and the results are more uniform, with no break or abrupt rate of change of flow or power. It will be noted here that each gate is called upon to perform its constantly and uniformly changing work in such a manner as to eliminate entirely undue strains and vibrations within the device. There are at all times only two compartments within a cylinder since at the point 6 the rotor 52 does not make contact and furthermore grooves 53 assist in insuring free flow between the sections of the compartments.

A more specific application of the principles involved in the construction of a device along the lines suggested by the structure of Figs. 1 and 2 are illustrated in the remaining figures.

Fig. 3 is a section through the INT type and shows the structure of a device similar to that diagrammatically illustrated in Fig. 1, and Fig. 4 is a cross section taken along the line 4—4 of Fig. 3 considered as a combination of two INT types. In these figures, 300 is the centre dividing plate upon which the remainder of the structure is assembled. Parts 302 and 304 form the cylinder which is constructed in two parts in order that the ring member 306 may be inserted therein. A recess 308 is provided wherein the ring or circular member 306 is free to rotate and oscillate. Through the walls of the cylinder from suitable openings provided therefor abutments 310 project which contact with the eccentric rotor at their bearing surfaces 311 and form two compartments 325 and 327. These abutments 310 are held against the eccentric members 312 and 313 by means of the ring 306. This ring is constructed of a material which is preferably somewhat flexible and of a diameter slightly less than the distance between the points 35 of contact where the ring bears on the abutments 310, so that a slight application of force is necessary to apply the ring in place upon the abutments which ring will thereafter exert a slight and constant pressure on the abutments to form a tight seal against the eccentric member 312. While strictly speaking a device constructed according to the principles set forth in this invention, the ring would have to be only of such size as to make a snug fit with the ends of the abutments, it is preferable that it be of a slightly smaller size in order to form a particularly tight seal and to compensate for wear or imperfection in manufacture. The eccentric members 312 and 313 are mounted upon a shaft 314 which shaft is provided with a collar portion 316 which may or may not form a bearing surface with centre dividing plate 300 and to which the eccentric members 312 and 313 may be keyed. Key members 318 pass through the collar 316 of the shaft and through the eccentric members 312 and 313 to hold them in their proper position with respect to the shaft. Ducts 321 and 322 extend from the surface of the eccentric member 312 to the sections 324 and 326 of the shaft 314 to form conduits for incoming and outgoing fluid. On the outside of the eccentric members, 312 and 313 and cylinders 302 are cover plates 328 and the whole held in position by nut and bolt assemblies 330 which pass through the cover plate, portion 304 of the cylinder, the centre dividing plate 300 and suitable gaskets between the parts where necessary to give a tight seal. Bearings 332 attached to the cover plates 328 permit the assembly to rotate with respect to the shaft 70 314 and the eccentric members 312 and 313 with a minimum of friction. Since, as has been suggested above, it is generally desirable that the inlet and outlet ports be upon a stationary portion of the machine, the eccentric members 312 and 313 and shaft 314 are held stationary and the cylinders provided with grooves 315 on their inner surfaces with their attached cover plates etc., are rotated about the shaft and pistons by means of, for instance, a pulley 334.

In Fig. 4 the arrangement of adjacent machines wherein the vanes are in different quadrants is illustrated.

Figs. 5 to 9 illustrate various embodiments of the so-called EXT type. Figs. 5 to 7 represent the single and Figs. 8 and 9 a dual type. In these modifications the eccentric surfaces are on the outer member which may be termed a cylinder and is designated 400. This cylinder is composed of the portion 402 on the inside of which is the eccentric surface 404. A shaft 406 has an enlarged section 408 which is keyed to a non-eccentric circular rotating piston 410. Upon the surface of the piston are grooves 412 which permit free flow of fluid within the compartments at all times as particularly described above. The piston is held in non-rotatable relationship with the shaft by means of a set screw 414 or other suitable keying means or else made integral with the shaft. Cover plates 416 and 418 hold the cylinder 402 in proper position with respect to the shaft 406. One of these may have a covering 420 for the end of the shaft, and the other an opening through which the shaft extends to gears or pulleys etc., not shown. The cover 420 may be eliminated and the shaft 406 extend both ways if desired. Nut and bolt assemblies 422 are used to attach the cover plates to the cylinder. Openings are provided through the cylinder 402 for inlet and exhaust ports 424 and 426 with provision for attaching thereto conduits 428 and 430.

Suitable recesses are provided in non-eccentric rotary piston 410 for vanes 432 and 434. These vanes 432 and 434 are joined to each other by a connecting rod 436 which slides through an opening in shaft 406 which should be larger than connecting rod 436 in order that lubricant may pass between the rod and the sides of the opening and also so that there could be free passage between the recess for vane 434 and recess for vane 432 to prevent undesirable back pressure which would otherwise build up and result in the noisy and inefficient operation of the device. Instead of a connecting rod 436 illustrated in connection with Figs. 5 to 7, a ring structure such as that shown in Figs. 3 and 4 for the INT type and particularly illustrated for use with the EXT type in Figs. 20 to 27 inclusive may be employed. Which of the two ports 424 or 426 will be the inlet port depends upon the direction of rotation. If employed as a pump, for instance, and the rotor piston 410 were rotated in a clockwise direction, port 426 would be the outlet and port 424 the inlet.

Figs. 8 and 9 illustrate the modification of the EXT type in which the non-eccentric adjacent pistons have their respective vanes in different quadrants. As illustrated, the two eccentric cylinders 402 have the same angles of eccentricity and a uniform flow of power is secured, as stated, by varying the angularity of the pistons by 90° which puts each of the vanes 434 in a different quadrant. The general structure of this duplex combination is similar to that shown in Figs. 3 and 4, except that it is a reverse application of the same general principle. The eccentric member being in the case of Figs. 8 and 9 the cylinders whereas in Figs. 3 and 4 it is the pistons.

This embodiment includes a shaft 452 the end of which may be in a hub cap 454. On the shaft and keyed thereto are pistons 456 and 458 provided with recesses 460 for the vanes 434 which are shown as connected by connecting rods 462 which pass through openings 464 in the shaft 452. The shaft is also provided with a collar 465 on which is rotatably mounted a central dividing plate 466 arranged between the respective cylinders 402. The eccentric cylinders 402 are further held in place and compartments formed by cover plates 468 which have bearings 470 attached thereto to permit free rotation about the shaft 452.

The cover plates 468, cylinders 402 and central dividing plate 466 which may be separated by suitable gaskets are all attached to each other and held in position by means of nut and bolt assemblies 472. Within this assembly the shaft 452, pistons 456 and 458, collar 465 and vanes 434 are free to rotate. Since, as illustrated, the eccentricity of the cylinders are, in both cases, in the same angular direction, the inlet and outlet ports are at the same side and advantage of this fact may be taken by providing ducts 474 and 476 whereby a single conduit 478 suffices as an inlet or outlet at one side and a single conduit 480 serves as an outlet or inlet at the other side depending on the direction of rotation.

Instead of arranging the cylinders 402 with their angles of eccentricity in the same direction, one may be rotated 180° with respect to the other, in which case its outlet port for a given direction of rotation would be varied 180°. Then by placing the vanes in the same plane and providing suitable connecting ducts a two stage device may be had.

Figs. 28 and 29 illustrate an embodiment of the invention in a multiple stage rotary pump, compressor or driven motor. In this illustrated embodiment two multiple expansion units of two stages each are shown as a single machine. It should be obvious, of course, that any number of stages or units could be combined into a single machine if desired. The illustrated device includes a shaft 700 journaled in bearings 702 at each end of the device. The shaft is slightly enlarged at 704 to provide mountings for pistons 706 and 708 or the pistons may be a part of the shaft. A collar 710 divides the two units and forms a mounting or bearing for centre dividing plate 712. The illustrated embodiment is of the EXT type and the pistons 706 and 708 are of substantially equal size and circular and are provided with the usual grooves 712. Circular plates 714 separate the two pistons and cylinders of each two stage unit and are rotatable upon the enlarged portion 704 of the shaft 700 as well as with respect to the pistons 706 and 708.

Since the noneccentric pistons are all of the same size the multiple expansion or compression is obtained through varying the size and/or eccentricity of the cylinders. The stages are designated as stage I, stage Ia, stage 2 and stage 2a, in which those designated by number alone comprise one unit and those designated by a letter comprise the second unit. The cylinders 716 and 716a of stages I and Ia are illustrated as of substantially the same size and having the same eccentricity and are larger than the cylinders 718 and 718a of stages 2 and 2a which have a lesser eccentricity and size. The vanes 720 and 723 are slidable in the noneccentric pistons and contact with the inner surface of the eccentric cylinders 716, 718, 716a and 718a. As illustrated they are held in position by connecting rods 724 although it should be understood that as in other cases rings which are illustrated in Figs. 20 to 27 inclusive might be employed in place of the connecting rods. The pistons are keyed to the shaft by means of keys 726 which pass through or in contact with the collar 710. The end plates 728, cylinder 718a, dividing plate 714, cylinder 716a, centre dividing plate 712, cylinder 716, dividing plate 714 and cylinder 718 are all held in place by nut and bolt assemblies 730 with respect to which the shaft, pistons and gates rotate.

As illustrated the eccentricity of the eccentric member of stage 1a is in contra position or at 180° from that of the eccentric member of stage 2a and the same is true with respect to stage 1 and stage 2 respectively. By this arrangement the outlet of stage 1a would be on the same side of the machine as the inlet to stage 2a and instead of an exterior duct an opening such as 732 may be used to connect the respective outlet and inlet. In the same manner a duct 734 connects the inlet and outlet of stages 1 and 2 respectively. As illustrated the gates for one unit are in the same direction but those of adjacent units are at right angles to those of the first unit to assist in a uniform compression or flow of power. Assuming that the device is to be employed as a compressor the port 736 would be the inlet and the compressible material would be fed into stage 1 directly and stage 1a through duct 738. Rotation of the shaft, pistons and gates would cause a compression in stages 1 and 1a and the compressed material would be discharged through ducts 732 and 734 to stages 2a and 2 respectively. In this stage a further compression would be made and the compressed material discharged through ducts 740 and 742 to a common discharge pipe 744.

It will be obvious that various changes in location of parts, arrangement and design may be substituted for the one illustrated and that in addition to being useful as a compressor or multiple stage rotary pump by supplying fluid under pressure to the pipe 744 and discharging it through the conduit 736 the device would operate as a multiple expansion motor.

An important consideration when operating a multiple stage device with elastic fluids to be compressed or expanded is that the partially compressed or partially expanded charge passing from one stage to a succeeding stage will be suitably received by the compartment provided for such charge. To accomplish this the device may have a different eccentricity in each of the two stages as well as having the eccentricity disposed at 180° from each other. A similar result can, of course, be secured by otherwise varying the size of the compartment receiving the charge in the succeeding stage.

Figs. 10–16 show various arrangements of vane or abutment ends by means of which tight seals may be secured between the vane or abutment and the eccentric surface against which it rotates. In Fig. 10, the vane 502 is urged against the eccentric surface 504 by means of a ring 506. At the end of the vane is a member 508 semi-cylindrical in shape which fits into a semi-cylindrical groove in the end of the vane 502. There are in the semi-cylindrical member 508 two semi-cylindrical grooves in which are placed semi-cylindrical members 510 and 512 which seat against and form a tight seal on the eccentric surface 504. To assist in lubricating the surface 504 a conduit 505 extends from the base of the vane 502 in order to carry lubricant from the centre recess to the base of semi-cylindrical member 508, wherein are holes 507 which carry the lubricant to the semi-cylindrical members 510 and 512 and to the eccentric surface 504. Grooves 509 are also provided through semi-cylindrical members 510 and 512 to carry lubricant through them to their point of contact with the eccentric surface. The relationship of the port opening is also illustrated in this connection and it should be noted that this port opening 514 is of such size that it is completely covered by the vane surface in contact with the eccentric surface 504 and thereby prevents back-flow.

The structure of Fig. 11 is that of a simple unitary type of vane end wherein the end of the vane 516 has a blunt taper which gives a relatively small surface as a bearing during most of the rotation since the taper corresponds with the eccentric curve only at the ports. This type of vane end, however, is most suitable for use in a machine which requires an absolutely constant length vane since the only truly bearing surface is on a single line 518.

It will be noted that this type of vane end will not close a port of the size and shape illustrated, and it is, therefore, usually desirable to construct the port with a modified opening for example in the manner shown in Fig. 13.

Fig. 12 is substantially the same type of abutment end as the vane illustrated and described in connection with Fig. 10, except that it is applied to the INT type. It differs slightly in that the two semi-cylindrical members 522 instead of having uniform curvature on their non-cylindrical surfaces have relatively sharp edges 523 at their extremities, and a void 524 between these points the object of which is to provide a place for collecting and discharging lubricant as the size of the voids vary with the shape of the curve being traversed.

Fig. 13 shows a type of abutment end similar to that of Fig. 11 applied to an INT type but with a constricted or modified port opening 526 which is substantially closed by the portion of the abutment in contact with the eccentric surface and no back-flow is possible.

In Fig. 14 is illustrated an abutment and in Fig. 15 a vane of a particular character that assists in efficient lubrication during operation with gaseous mediums or non-lubricating liquid mediums. The ends of the abutment 530 and vane 532 have semi-cylindrical grooves to hold semi-cylindrical vane or abutment ends 534 and 536 respectively. The important feature of this semi-cylindrical end is the shape of the surface of the semi-cylindrical member in contact with the eccentric surface. This face is provided with a substantial void 538, the size of which varies during the rotation of the vane or abutment upon the eccentric surface due to the change in shape of this surface, and as it does so it either draws in more lubricant or expresses lubricant. It will be noted that with this type of gate end, the gates cannot be theoretically of constant length since there are at least two bearing surfaces 537 and 539 disposed on opposite sides of the centre line of gate and a short though substantial distance therefrom. This centre line corresponds to line 108—110 of Fig. 1 and 14—16 of Fig. 2. Although the semi-cylindrical member can rotate within limits in its socket this will not entirely compensate for the changing shape of the curve upon which the gate rotates and at least a slight variation in the length of the vanes or distance apart of the abutments results. The fact that this gate will not be constant in length is readily taken care of in the present structure through the flexible ring 540 urged against the abutment 530 or 542 urged against the vane 532 which takes up any variation in length of the gate.

A further advantage of this shape is that each semi-cylindrical end having two separated bearing points insures perfect oscillation within the semi-cylindrical socket and thus prevents possible vibration or chattering which would occur if the semi-cylindrical end at any time seated on a single point at or near its centre against the eccentric surface.

Fig. 16 is a further modification of the combination of semi-cylindrical vane ends illustrated in Figs. 10 and 12. In this case there are 4 semi-cylindrical members in contact with the eccentric surface. Obviously this number could be increased as desired within the limits of practical construction. They are or may be lubricated through the system of ducts illustrated in Fig. 10 and in fact any type of vane or abutment may be lubricated in this manner.

In Fig. 17 is illustrated a type of valve particularly suitable for the general control of the operation of the device. The pipe 600 may be considered as an extension of the pipe or shaft 314 of Figs. 3 and 4. From this pipe extend conduits 602 and 604 which supply to or deliver fluid from the mechanism. These conduits 602 and 604 may be provided with valves not shown. When the valve 606 is open, as illustrated, rotation of the cylinder 302, Figs. 3 and 4, would have no effect upon the fluid supplied or delivered through conduits 602 and 604 since the fluid in the device would merely circulate back and forth about the partition 608 between the two compartments 325 and 327. When, however, the valve 606 is closed against the end of the shaft 600 the rotation of the cylinder 302 will be effective to draw fluid through the supply conduit and force it out through the delivery conduit.

Fig. 18 illustrates a modification of the valve shown in Fig. 17 that is particularly designed for use with the device when it serves as a clutch or brake control. The stator 312 is held stationary while cover plates 610 and 612 along with the cylinder and abutments, not shown, are free to rotate about the shaft 614. Within the hollow shaft 614 is a tube 616 provided with openings 618 which are shown lined up with the conduits through the stator 312. Referring now to Fig. 3 it will be apparent that if there were a conduit connecting the two compartments 325 and 327, rotation of cylinder 302 would merely force fluid back and forth between compartments. However, if the connection between the two compartments were closed as by turning the valve handle 620 so that the holes 618 would not register with the conduits, the rotation of cylinder 302 would be prevented by the fluid pressure which would build up in one compartment. It will thus be seen that the device will serve as a brake by controlling the flow of fluid between the two compartments when no other inlet or outlet is provided.

In Fig. 19 is diagrammatically illustrated the method of supplying lubricant to the device when non-lubricating liquids or a gas is the fluid medium. The chamber 622 is adapted to act as a reservoir and hold lubricant and may if desired be provided with cooling coils or other means for cooling the lubricant may be employed. Assuming that the conduit 624 is the inlet and 626 is the outlet, it will be obvious that the pressure on the lubricating conduit 628 will be relatively greater than that on 630 and force the lubricant contained in the air tight chamber 622 up the conduit 630 to inlet conduit 624 from whence it will be carried to the chambers within the cylinder and at least a part of it will, of course, pass out through the outlet conduit 626 where it will separate in the U-shaped tube and be forced back into chamber 622 by the pressure in the delivery conduit. A needle valve or other means of constricting the conduit 630 may regulate the amount of flow of lubricant.

As shown in Fig. 19 the inlet and outlet conduits are on a line about 45° from the horizontal which insures the retention of a portion of the lubricant within the cylinder. Obviously the amount of fluid which will be retained within the cylinder, and as a result the degree of compression obtained when the device is used as a compressor can be controlled by the relative positions of the inlet and outlet ports. Various other means of lubricating may, of course, be employed with the instant device if so desired, but this particular arrangement has been found especially suitable. The shaft has been illustrated as being positioned horizontally but it should be clear that it might be vertical or at any other desired angle.

Figs. 20 to 27 show the arrangement by which vanes of the EXT type are urged out against the eccentric surface of the cylinder and the modifications illustrated may be employed with the device as shown in Figs. 2 and 5 to 9. This arrangement comprises a piston 640 provided with openings for vanes 642. The piston 640 may be constructed in the manner shown in Fig. 21 wherein two annular recesses 644 are provided on each side of the rotor or in the manner shown in Fig. 23 wherein a central annular chamber 646 is provided in each of the pistons 648. To secure a central annular chamber 646 it is necessary to construct the piston in at least two pieces so that the ring may be inserted into the central chamber. This structure as illustrated in Fig. 23 which is a cross section of Fig. 22 along the line 23—23, includes a shaft 645 which if used in connection with a dual unit is provided with a collar. On each side of this collar is an annular washer 649 which slides over the shaft and rests against the collar and forms one part of the pistons. The pistons being constructed in two parts 647 and 649 so that, in assembling, the annular washers 649 are first put on the shaft; the rings are then inserted in the annular chambers 646 which are recesses in the parts 647 of the pistons; then the remaining parts 647 of the pistons are slid into place along the shaft, after which all parts 647 and 649 of the pistons are keyed to the collar by dowels, bolts or other usual means. The rings thus located in the annular recesses 646 will urge outward against the vanes 642 as they slide back and forth in the slots 648 provided in the pistons for that purpose. Instead of the structure illustrated the piston may be formed in two pieces, as for instance, by cutting a solid piston through the centre at right angles to the shaft and machining half of the chamber in each portion of the piston. The ring may then be placed in one of the annular chambers and the other half of the piston placed against it to complete the chamber after which they are held in place by keys, bolts or other usual means.

If two recesses 644 are employed in each piston, two rings 650 are required as illustrated in Fig. 25 to bear against the vanes 642.

For the single ring type as illustrated in Fig. 23, the arrangement of the ring is illustrated in Figs. 26 and 27 wherein a single ring 652 is placed at the centre of the bottom of each of the two vanes 642. Either of the modifications shown in Figs. 21 and 23 may be employed in place of the connecting rods shown in Figs. 2, and 5 to 9 with the advantage that the resilient or semi-rigid ring 650 or 652 may be under a slight tension when in position and will hold the vanes in position even though there has been some wear on the eccentric surface or imperfection in manufacture. The ring construction is particularly suitable when a vane or gate having a wide bearing surface is employed since as above noted it cannot then be of absolutely constant length and the slightest variations in length are adequately compensated for by the ring.

When the device is designed with a relatively great distance between the eccentric and non-eccentric surface at any point it may be desirable to provide an additional bearing surface for the abutment in the INT type. This additional bearing surface is illustrated in Figs. 30 and 31 which should be considered in connection with Fig. 4. When the abutment 311 projects from its recess in the cylinder 304 for any substantial distance the pressure of the fluids in the compartments tends to force it in one direction or the other which may cause a binding action and interfere to some extent with its sliding back and forth. To prevent this possible difficulty and provide an additional seal between the compartments a groove 307 is made in the side wall 328 and side wall or centre dividing plate 300. The abutment 311 is provided with ridges shaped to fit the grooves 307 and when the abutment is in place the ridges and grooves form a bearing surface for the abutment and side plates and in addition assist in sealing the compartments on both sides of the abutment from each other.

Having thus described my invention in a specific and preferred embodiment which, however, is not to be construed as limiting but rather as illustrative of the invention, what I claim as my invention is:

1. In a rotary pump, compressor, or driven motor consisting of two compartments the combination of a rotor and a stator arranged eccentrically to each other with a clearance between them, a single pair of gates on said rotor dividing the space between the stator and rotor always into only two compartments, said rotor being provided with recesses on each side of the gates joining points on the circumference thereof to permit free flow of fluid within each compartment even past the point of least clearance of the rotor and stator.

2. In a rotary pump, compressor, or driven motor consisting of two compartments the combination of a rotary cylinder and a stator arranged eccentrically to each other with a clearance between them, a single pair of abutments on said cylinder dividing the space between the stator and cylinder always into only two compartments, said cylinder being provided with circumferential recesses to permit free flow of fluid within each compartment even past the point of least clearance of the cylinder and stator.

3. In a rotary pump, compressor, or driven motor consisting of two compartments the combination of a rotary piston and a cylinder arranged eccentrically to each other with a clearance between them, a single pair of vanes on said piston dividing the space between the cylinder and piston always into only two compartments said piston being provided with circumferential recesses to permit free flow of fluid within each compartment even past the point of least clearance of the piston and cylinder.

4. In a rotary pump, compressor, or driven motor consisting of two compartments the combination of a stator, a rotor eccentrically disposed with respect to said stator and spaced therefrom so that there is no contact between their eccentric surfaces at any point, a single pair of gates slidable in said rotor bearing upon said stator dividing the space between said rotor and stator always into only two compartments and outlet and inlet ports on said stator oppositely disposed with respect to the centre of eccentricity on the one diameter coinciding with the gates as said gates alternate or reverse the functions of said compartments, each compartment having alternating communication for successive half revolutions of the rotor with said outlet and inlet ports on said stator.

5. In a rotary pump, compressor, or driven motor consisting of two compartments the combination of a stator, a cylinder eccentrically disposed with respect to said stator and spaced therefrom so that there is no contact between their eccentric surfaces at any point, a single pair of abutments slidable in said cylinder bearing upon said stator dividing the space between said cylinder and stator always into only two compartments and outlet and inlet ports on said stator oppositely disposed with respect to the centre of eccentricity.

6. In a rotary pump, compressor, or driven motor consisting of two compartments the combination of a cylinder, a piston eccentrically disposed with respect to said cylinder and spaced therefrom so that there is no contact between their eccentric surfaces at any point, a single pair of vanes slidable in said piston bearing upon said cylinder dividing the space between said piston and cylinder always into only two compartments and outlet and inlet ports on said cylinder oppositely disposed with respect to the centre of eccentricity on the one diameter coinciding with the vanes as said vanes alternate or reverse the functions of said compartments, each compartment having alternating communication for successive half revolutions of the piston with the outlet and inlet ports on said cylinder.

7. In a rotary pump, compressor, or driven motor the combination of a rotor, a stator having its cross section defined by an eccentric curve in which all straight lines through its centre of eccentricity joining points on the perimeter are of equal length, outlet and inlet ports in said stator on a line drawn through the centre of eccentricity of the curve at right angles to a line joining the most and least eccentric portions of said curve and a single pair of gates on said rotor with circumferential lengths equal to the circumferential opening of the ports to divide the space between the rotor and stator always into only two compartments.

8. In a rotary pump, compressor, or driven motor the combination of a rotor, a stator having its cross section defined by an eccentric curve in which all straight lines through its centre of eccentricity joining points on the perimeter are of equal length, outlet and inlet ports in said stator on a line drawn through the centre of eccentricity of the curve at right angles to a line joining the most and least eccentric portions of said curve, a single pair of gates on said rotor to divide the space between the rotor and stator always into only two compartments and a semi-rigid circular member cooperating with said gates to hold them in contact with the stator.

9. The combination of at least two pumps, compressors, or driven motors as set forth in claim 7 in which adjacent eccentric members are 180° eccentric to each other.

10. The combination of at least two pumps, compressors, or driven motors as set forth in claim 7 in which the adjacent rotors have their gates in different quadrants.

11. In a rotary pump, compressor, or driven motor the combination of a cylinder, a stator within said cylinder having its cross section defined by an eccentric curve in which all lines through its centre of eccentricity joining points on the perimeter are of equal length, outlet and inlet ports in said stator on a line drawn through the centre of eccentricity of the curve at right angles to a line joining the most and least eccentric portions of said curve, and a single pair of abutments of circumferential length substantially equal to the circumferential opening of the ports on said cylinder to divide the space between the cylinder and stator always into only two compartments, said abutments being oppositely disposed so that they pass and substantially close both ports simultaneously.

12. In a rotary pump, compressor, or driven motor the combination of a cylinder, a stator within said cylinder having its cross section defined by an eccentric curve in which all lines through its centre of eccentricity joining points on the perimeter are of equal length, outlet and inlet ports in said stator on a line drawn through the center of eccentricity of the curve at right angles to a line joining the most and least eccentric portions of said curve, a single pair of abutments of circumferential length substantially equal to the circumferential length of the ports on said cylinder to divide the space between the cylinder and stator always into only two compartments, said abutments being oppositely disposed so that they pass and substantially close both ports simultaneously and a semi-rigid circular member freely floating in the cylinder acting on the exterior ends of the abutments in such a manner that relative or frictional movement between said circular member and the abutments is unnecessary to hold said abutments in contact with the stator.

13. The combination of at least two pumps, compressors or driven motors as set forth in claim 11 in which adjacent stators are 180° eccentric to each other.

14. The combination of at least two pumps, compressors or driven motors as set forth in claim 11, in which adjacent cylinders have their abutments in different quadrants.

15. In a rotary pump, compressor, or driven motor the combination of a rotary piston, a cylinder surrounding said piston and having its interior cross section defined by an eccentric curve in which all lines through its centre of eccentricity joining points on the perimeter are of equal length, outlet and inlet ports in said cylinder on a line drawn through the centre of eccentricity of the curve at right angles to a line joining the most and least eccentric portions of said curve, and a pair of vanes on said piston with circumferential lengths equal to the circumferential opening of the ports to divide the space between the piston and cylinder always into only two compartments, said vanes being oppositely disposed so that they pass and substantially close both ports simultaneously.

16. In a rotary pump, compressor, or driven motor the combination of a rotary piston, a cylinder surrounding said piston and having its interior cross section defined by an eccentric curve in which all lines through its centre of eccentricity joining points on the perimeter are of equal length, outlet and inlet ports in said cylinder on a line drawn through the centre of eccentricity of the curve at right angles to a line joining the most and least eccentric portions of said curve, a single pair of vanes of circumferential length substantially equal to the circumferential length of the ports on said piston to divide the space between the piston and cylinder always into only two compartments, said vanes being oppositely disposed so that they pass and substantially close both ports simultaneously and a semi-rigid circular member within the piston acting against the interior ends of the vanes in such a manner that relative or frictional movement between said circular member and the vanes is unnecessary to hold them in contact with the cylinder.

17. The combination of at least two pumps, compressors or driven motors as set forth in claim 15 in which adjacent cylinders are 180° eccentric to each other.

18. The combination of at least two pumps, compressors or driven motors as set forth in claim 15 in which adjacent pistons have their vanes in different quadrants.

19. In a multistage rotary pump, compressor, or driven motor the combination of at least two adjacent devices, each comprising a rotor and a stator arranged eccentrically to each other with a clearance between them, a single pair of gates on each rotor dividing the space between the stator and rotor always into only two compartments and recesses in each rotor to permit free flow of fluid within a compartment even at the point of least clearance of the rotor and stator, the amount of relative eccentricity of the rotor and stator of said adjacent devices being different to provide a chamber of suitable size for one device to receive a charge from the adjacent device.

20. In a multistage rotary pump, compressor, or driven motor the combination of at least two adjacent devices, each comprising a rotor, a stator eccentric to said rotor having constant clearance therewith, said stator having its cross section defined by an eccentric curve in which all straight lines through its centre of eccentricity joining points on the perimeter are of equal length, outlet and inlet ports in said stator on a line drawn through the centre of eccentricity of the curve at right angles to a line joining the most and least eccentric portions of said curve and a pair of gates on said rotor to divide the space between the rotor and stator always into only two compartments, the size of the corresponding compartments in said adjacent devices being different through varying the amount of eccentricity of the stator curve.

JAMES M. HAND.